REGULATION OF HEAD SPACING BY AIR BEARING MEANS

Filed Jan. 29, 1958

INVENTOR.
Joseph M. Uritis
BY
Morris A. Rabkin
ATTORNEY.

United States Patent Office 3,030,452

Patented Apr. 17, 1962

3,030,452

REGULATION OF HEAD SPACING BY AIR BEARING MEANS

Joseph M. Uritis, Haddonfield, N.J., assignor to Radio Corporation of America, a corporation of Delaware Filed Jan. 29, 1958, Ser. No. 711,871
6 Claims. (Cl. 179—100.2)

This invention relates to magnetic recording apparatus.

In data storage apparatus employing magnetic recording, such as drum, disk, tape and the like apparatuses, the efficiency with which information is stored increases with a decrease in the spacing between the transducing means (the magnetic head) and the recording medium. In certain prior applications, particularly relatively slow-speed tape apparatus, the magnetic head and the recording medium are operated in actual contact. However, such an arrangement has a number of disadvantages among which is excessive wear of either or both of the recording medium and the magnetic head. In most high-speed apparatuses, the wear problem is avoided by spacing the magnetic head as closely as possible to the recording medium but without actual contact. However, mechanical imperfections, such as surface run-out, vibration problems, etc., necessitate either a very accurate control of the mechanical tolerances of the apparatus, in the case of a fixed magnetic head, or additional means to permit movement of the magnetic head towards and away from the recording medium.

It is an object of the present invention to provide improved data storage apparatus of the magnetic recording type, permitting a relatively close spacing between a magnetic head and a recording medium.

Another object of the invention is to provide a novel means for, and methods of, regulating the spacing between a magnetic head and a recording medium.

Still another object of the invention is to provide an improved data storage apparatus of the above-mentioned type, wherein a desired constant spacing between a magnetic head and a recording medium is established in a simple and efficient manner.

The present invention is an improvement over that described in copending application by Martin L. Levene and Carl Lauxen, entitled "Data Storage Apparatus," filed concurrently herewith.

According to the present invention, a pair of pressurized bearings, such as thrust-bearings, are differentially operated to establish a desired spacing between a magnetic head carried by one member, and a recording medium carried by another member. One of these pressurized bearings also serves to maintain the desired spacing between the magnetic head and the recording medium.

A feature of the present invention resides in the method of obtaining the desired spacing which includes observing the amplitude of an electrical signal previously written into the recording medium as the differential pressures are applied to the bearings.

Figure 1:
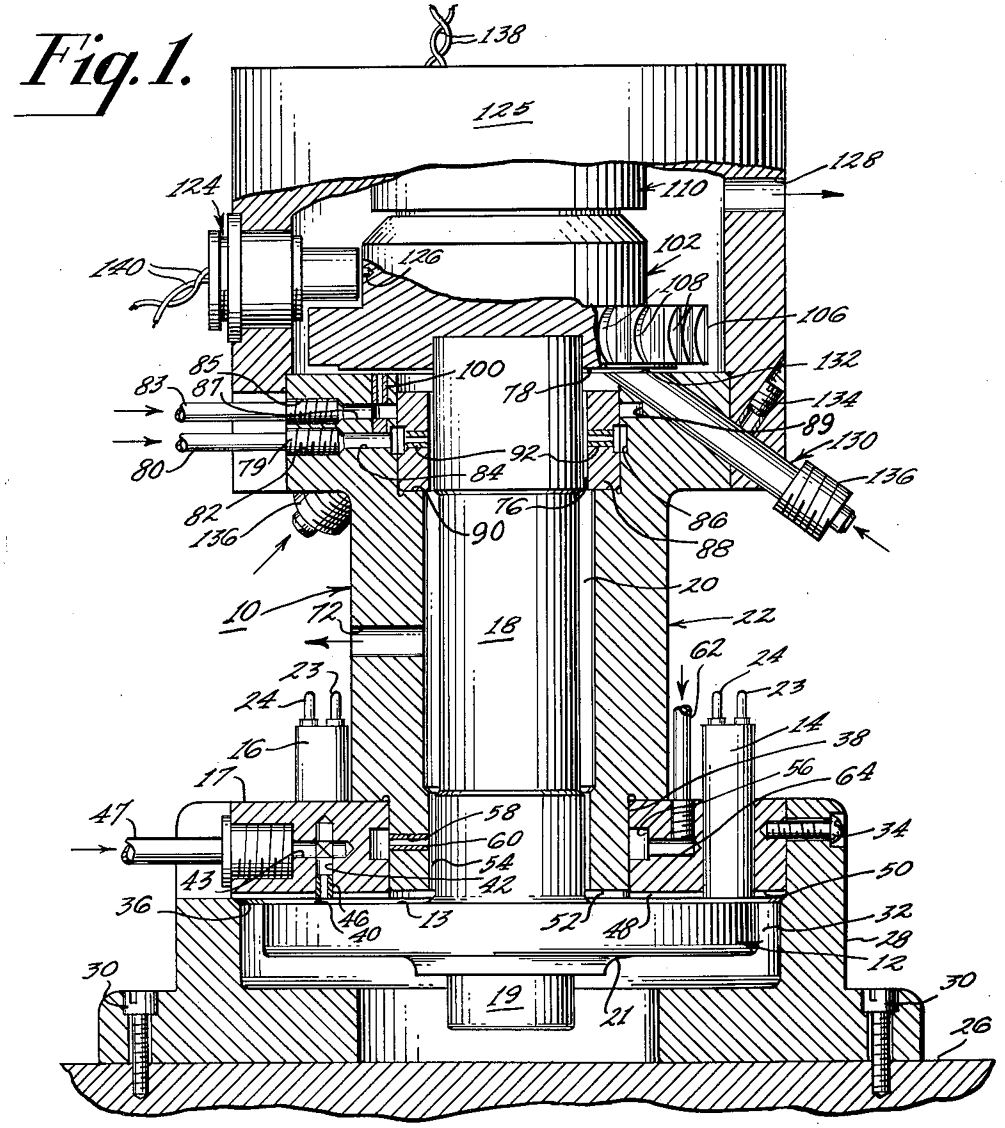
Figure 2:
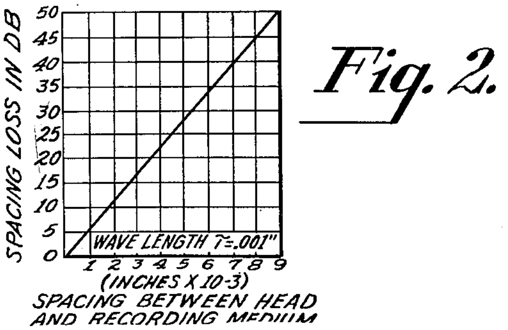

In the accompanying drawing:

FIG. 1 is an elevational view, partially in section, of one embodiment of a data storage apparatus according to the invention, and FIG. 2 is a graph, somewhat idealized, of the variation of a previously recorded electrical signal with variation in the spacing between the recording medium and the transducing means.

In the illustrative apparatus of FIG. 1, the invention is embodied in a disk-type storage apparatus. A recording medium 13 on the top surface of a disk 12 is moved relative to magnetic heads 14, 16 fastened in a fixed member 17. Rotary power is supplied to the disk 12 by a solid cylindrical shaft 18 fitted within the through-bore 20 of a sleeve member 22. Preferably, the disk 12 is integral with the shaft 18 for purposes of providing increased resistance to centrifugal forces that are present during high-speed operation. For ease of machining, and for additional mechanical strength, the shaft 18 has a lower extension 19 below the bottom surface of the disk 12. A shoulder piece 21 is integral with the bottom surface of the disk 12 and the lower extension 19 of the shaft 18. The shoulder piece 21 and the lower extension 19 of the shaft 18 also facilitate balancing, if required, of the rotatable portions of the storage apparatus. For example, during a conventional balancing operation, a portion of the shoulder piece 21 and the shaft extension 19 may be removed without disturbing the recording and bearing portions of the storage apparatus.

The recording medium 13 on the disk 12 may be a high-remanence, magnetizable material applied by any suitable means such as coating or plating. A suitable magnetizable material is an alloy of nickel-cobalt-iron. The magnetic heads 14, 16, then, may be, for example, magnetic read-record heads which are used for coupling to different portions of the recording medium 13 on the disk 12. Each of the heads 14, 16 is provided with a different pair of electrical terminals 23, 24. Signals representing information to be stored in the recording medium are applied across the head terminals 23, 24. The information may be in the form of coded pulses, or it may be in the form of a continuous, time-varying, modulated wave. Any suitable known electronic circuitry, not shown, may be used for applying signals across the terminals 23, 24 of the heads 14, 16. The heads 14, 16 also are used, in known fashion, for reading the information previously stored within the recording medium. Thus, electrical signals appearing across the terminals 23, 24 of the heads 14, 16, during a reading operation, are applied to any suitable known gating circuitry, not shown, for further utilization.

A horizontal base support member 26 supports the apparatus for rotation of the shaft 18 and the disk 12 about a vertical axis. A side piece 28 is fastened to the base support 26 by any suitable means, such as screws 30. The head support piece 17 is fastened within the through-bore of the side piece 28 by any suitable means, such as screws 34. The upper portion of the side piece 28 is counter-bored to provide a seat 36 for the head support piece 17. The seat 36 provides a convenient means for accurately locating the heads 14, 16 in an axial direction. The head support piece 17 also is fastened by any suitable means, such as a press fit, to an undercut portion 38 of the sleeve 22.

A channeling network is provided in the head support piece 17 to permit the introduction of pressurized fluid into a lower thrust-bearing space 40 between the disk 12 and the head support piece 17. A plurality of spaced axial channels 42 are bored in the head support piece 17 to connect with an outer annular chamber 43. Axial orifice inserts 46 connect the axial channels 42 in the head support piece 17 to the lower thrust-bearing space 40. Pressurized fluid is introduced into the outer chamber 43 by means of a hose 47 or other suitable conduit threaded in the outer portion of the head support piece 17 to connect with the outer chamber 42.

Pressurized fluid is conducted to a lower radial bearing space 54 by another channeling network in the head support piece 17. An inner annular groove 56, cut in the inner surface of the head support piece 17, is connected to the radial bearing space 54 by separate radial channels 58 drilled in the undercut portion 38 of the sleeve 22 at the location of the groove 56. Radial orifice inserts 60 in the radial channels 58 are used to introduce the pressurized fluid into the radial-bearing space 54. A radial channel 64 in the head support piece 17 conducts pressurized fluid from any suitable conduit 62 threaded in the head support piece 17 to the inner chamber 56.

Radial slots 48 are cut in the bottom surface of the head support piece 17 to provide thrust-bearing pads 50 and to channel the pressurized fluid from the thrust-bearing space 40 to an inner relief space 52. The inner relief space 52 and the radial-bearing space 54 connect with a middle relief space provided in the through-bore 20 of the sleeve 22 at the central portion of the shaft 18. The shaft 18 may be undercut at its central portion, as shown, to provide additional volume in the middle relief space. Radial channels 72 in the sleeve 22 connect the middle relief space to the atmosphere.

Other channeling networks are provided in the upper portion of the sleeve 22 to permit introduction of pressurized fluid to an upper radial-bearing space 76 and to an upper thrust-bearing space 78. An inlet connector 79 is threaded in an inlet port 82 drilled in the upper portion of the sleeve 22. A hose 80 or other suitable conduit is used for connecting a source of pressurized fluid (not shown) to the upper inlet port 82. A radial channel 84 connects the inlet port 82 to a chamber 86 formed at the upper portion of the sleeve 22 by mating grooves in the sleeve 22 and in an annular ring 88 fastened to the sleeve 22 by any suitable means, such as by a press-fit. The ring 88 is located in the axial direction by a seat 90 provided by counterboring the upper portion of the sleeve 22. Radial orifice insert pieces 92 connect the chamber 86 with the upper radial-bearing space 76.

Pressurized fluid is introduced into the upper thrust-bearing space 78 by means of another inlet hose 83 threaded in another inlet port 85 in the sleeve 22. A radial channel 87 connects the inlet port 85 to another annular chamber 89 in the sleeve 22. Axial orifice inserts 100 in the axial channels 96 are used to introduce the pressurized fluid into the upper thrust-bearing space 78.

A device for rotating the shaft 18 and the disk 12, such as a turbine device, is mechanically coupled to the upper end of the shaft 18. In the specific illustrative embodiment, the turbine device is a reaction-type turbine. However, other known turbine devices may be used, if desired. The spindle 102 of the turbine is fastened to the upper end of the shaft 18 by any suitable means, not shown. Fastened to the spindle 102 is a turbine wheel 106 having buckets 108 formed therein. A commercially available magnetic hysteresis brake 110 is fastened to the turbine spindle 102 by any suitable means, not shown. The brake 110 has a pair of leads 138 for receiving electric current.

A commercially available reluctance pickup means 124 is fitted in an end cap 125 to cooperate with a hole 126 drilled in the spindle 102. The end cap 125 is provided with a radial channel 128 for conducting pressurized fluid from the interior of the apparatus 10 to the atmosphere. The reluctance pickup 124 has a pair of signal output leads 140.

Turbine nozzles 130 for directing pressurized fluid against the turbine buckets 108 are fixed in angular holes drilled through the end cap 125 and the sleeve 22. The mouth 132 of each nozzle 130 is flared for better distribution of the pressurized fluid against the turbine buckets 108. Set screws 134 are used to prevent rotation of the nozzles 130. Threaded couplings 136 are used to connect the nozzles 130 with any suitable source, not shown, of pressurized fluid.

After assembly, the shaft and disk 12 provide a rugged unit adapted to rotate at high speeds, say 50,000 r.p.m. and upwards. In practice, after the retentive material 13 is placed on the top surface of the disk 12, a fine lapping compound is placed over the retentive material 13 and then the disk 12 is brought in contact with the head support piece 17. The coated surface of the disk 12 is rubbed against the bottom surface of the head support piece 17 by rotating the shaft 18 and the disk 12. The magnetic coating 13 is harder than the material, such as aluminum, from which the head support piece 17 is formed. The lapping compound operates to lap the inner surface of the head support piece 17 to make it substantially parallel to the magnetic coating on the disk 12. After the lapping operation, the apparatus is disassembled, cleaned and reassembled. Nonmagnetic material, such as aluminum, may be used for the other mechanical portions of the apparatus 10.

In operation, pressurized fluid is applied to the inlet hoses 62 and 80 to provide a thin film of pressurized fluid in the lower and upper radial spaces 54 and 76, and to the inlet hoses 47 and 83 to provide a thin film of pressurized fluid in the lower and upper thrust-bearing spaces 40 and 78. The thin films of pressurized fluid operate to float the inner rotatable portion of the apparatus 10 relative to the fixed portion. A suitable pressurized fluid is compressed air, although other gases or gaseous mixtures may be used. A common source of pressurized fluid may be used if separate control valves, not shown, are connected in the inlet lines 47 and 83 for the thrust-bearing spaces 40 and 78. Preferably, the compressed air is filtered prior to its entry into the storage apparatus 10. Suitable filters are commercially available.

After the compressed air is applied to the inlet hoses, pressurized fluid is applied to the turbine nozzles 130. The turbine pressurized fluid also may be compressed air suitably filtered. The compressed air from the nozzles 130 strike the buckets 108, thereby rotating the shaft 18 and the disk 12 relative to the transducing means 14 and 16. By varying the pressure of the turbine air, the rotating speed of the apparatus can be varied. However, the hysteresis brake 110 provides an accurate and easily regulated means for controlling the rotational speed of the apparatus. The compressed air supply for the turbine may be arranged to be either fully on or fully shut-off. The desired rotational speed of the apparatus, when compressed air is supplied, then is controlled by electrical current supplied to the signal leads 138 of the hysteresis brake 110 from any suitable speed regulator, not shown.

Each time the turbine spindle 102 completes one revolution, a pulse is induced in the signal leads 140 of the reluctance pickup means 124. These induced pulses are applied as one input to the aforementioned speed regulator. Suitable speed regulators for this purpose are known in the servo-mechanisms art. Briefly, the regulator may operate to count the pulses from the signal pickup leads 140 to determine the actual rotational speed of the apparatus 10. The actual speed is then compared with the desired speed previously set into the regulator. A signal representing the difference is applied by the regulator to the signal leads 138 of the hysteresis brake 110. The force applied by the brake 110 increases or decreases in a proper sense to bring the apparatus 10 to the desired rotational speed. Because the apparatus 10 is driven by compressed air, any drift or speed variations, due to changes in the air pressure, temperature, etc., occurs over a relatively long time constant. Accordingly, a speed regulator of relatively simple construction may be used. By way of contrast, electric synchronous motors operated at high speed have a relatively short time constant with respect to speed variations or jitter. Thus, a faster operating and a more sensitive speed regulator is required when electric synchronous motors are used.

A further advantage of a storage apparatus according to FIG. 1 is that the pressurized radial bearings act automatically to maintain the shaft 18 concentric within the sleeve 22. Thus, the apparatus is relatively insensitive to mechanical vibrations.

The desired close spacing between the heads 14, 16, and the magnetic coating 13, are achieved by differentially adjusting the pressures of the compressed air flowing in the inlet hoses 47 and 83 of the thrust bearings. By increasing the pressure of the compressed air in the upper inlet hose 83, the thickness of the film of air in the upper thrust-bearing space 78 is increased, thereby moving the shaft 18 and the disk 12 in the upward direction. The film thickness in the lower thrust-bearing space 40 is reduced by a proportional amount for a given pressure of the compressed fluid in the inlet hose 47. Conversely, the pressure of the air flowing through the lower thrust-bearing space may be reduced, with this reduction in pressure causing the upward movement of the shaft 18. If desired, the pressure in the inlet hose 47 may be reduced coincidentally with the increase in pressure in the inlet hose 83.

The actual spacing between the recording medium 13 on the disk 12 and the pole tips of the heads 14, 16, can be determined relatively accurately by recording a signal of a given wavelength on the recording medium 13, and then detecting the amplitude of this signal when read out from the recording medium 13 as the thrust-bearing pressures are adjusted. As shown in FIG. 2, a plot of the spacing distance in milleinches versus reduction loss in decibels (db) of the previously recorded signal is a straight line. Thus, by applying the readout signal appearing across the terminals 23, 24 of one of the heads 14, 16, to an oscilloscope, the readout signal amplitude can be determined as the pressures in the inlet hoses 47 and 83 are adjusted. When the amplitude of the oscilloscope signal reaches a given value, as plotted in a graph similar to FIG. 2, the desired spacing is reached. The inlet pressures are maintained at the values corresponding to the desired spacing.

An article by Robert A. Wallace, published in the Bell System Technical Journal for October 1951, pages 1145–1173, describes the theory, explaining the linear relationship between the recorded signal amplitude loss, with increased spacing between a magnetic transducing means and the recording medium.

There has been described herein improved data storage apparatus having means for obtaining a desired close spacing between a recording medium and a transducing means.

In addition to the turbine devices disclosed herein, other prime-moving devices, such as electric motors, may be used for driving the movable portion of the storage apparatus. The differential adjustment of a pair of pressurized bearings provides an accurate and simple means of attaining a desired close spacing between transducing means and a recording medium.

What is claimed is:

1. In data storage apparatus having a first member carrying a recording medium and a second member spaced from said first member and carrying transducing means for coupling to said medium, one of said members being rotatable relative to the other, the improvement comprising pressurized fluid thrust bearings for supporting said first member, and means for differentially adjusting the fluid pressures of said bearings to adjust the spacing between said transducing means and said medium.

2. Data storage apparatus comprising a fixed member, a rotatable member, a magnetic recording medium carried by one of said members, magnetic transducing means for coupling to said medium carried by the other of said members, separate pressurized radial fluid bearings and separate pressurized fluid thrust bearings for supporting said rotatable member, and means for independently adjusting the fluid pressures of the separate thrust bearings for controlling the coupling between said magnetic transducing means and said magnetic medium.

3. In data storage apparatus having a rotatable disc carrying a recording medium and a fixed support piece having transducing means for coupling to said medium, the improvement comprising a shaft member fastened to said disc for producing rotation thereof, means providing a first pressurized fluid thrust bearing between said fixed support piece and said disc, means including said shaft for providing a second pressurized fluid thrust bearing remote from said disc, and means for differentially adjusting the fluid pressures of the said first and second thrust bearings for controlling the spacing between said medium and said transducing means.

4. In data storing apparatus, the combination of a rotatable member carrying a recording medium on one portion thereof, a fixed member around said rotatable member, transducing means fastened in said fixed member for coupling to said medium, a first pressurized fluid bearing formed between said recording medium and said fixed member, a second pressurized fluid thrust bearing formed between said fixed member and another portion of said rotatable member, said thrust bearings supporting said rotatable member within said fixed member, and means for differentially adjusting the fluid pressures of said bearings to control the spacing between said transducing means and said medium.

5. In data storage apparatus having a rotatable member carrying a magnetic recording medium, a fixed member around said rotatable member, and magnetic transducing means fastened in said fixed member for coupling to said medium, the improvement comprising first and second pressurized fluid thrust bearings at either end of said rotatable member, and means for separately adjusting the fluid pressures of said bearings to control the spacing between said transducing means and said medium.

6. In data storage apparatus, the combination of a rotatable member, a magnetic recording medium carried by said rotatable member, a fixed member, said rotatable member being mounted within said fixed member, magnetic heads fastened in said fixed member for coupling to said medium, channeling networks in said fixed member for providing separate pressurized fluid thrust bearings between said fixed member and said rotatable member for supporting said rotatable member, and further channeling networks in said fixed member for providing pressurized fluid radial bearings between said fixed and rotatable members, the pressures of the fluid of said separate thrust bearings being differentially adjusted to control the spacing between said magnetic heads and said medium.

References Cited in the file of this patent

UNITED STATES PATENTS

| | | |
|---|---|---|
| 2,694,192 | Dean | Nov. 8, 1954 |
| 2,768,244 | Tiger | Oct. 23, 1956 |
| 2,772,135 | Hollabaugh et al. | Nov. 27, 1956 |
| 2,787,750 | Jones | Apr. 2, 1957 |
| 2,797,378 | Johnson | June 25, 1957 |

FOREIGN PATENTS

| | | |
|---|---|---|
| 778,112 | Great Britain | July 3, 1957 |
| 1,020,803 | Germany | Dec. 12, 1957 |

OTHER REFERENCES

"An Air-Floating Disk Magnetic Memory Unit," by W. A. Farrand, address delivered by Western Electronic Show and Convention, Aug. 21, 1957; published by Autonetics, pp. 1 to 9.